United States Patent
Maali et al.

(10) Patent No.: US 11,126,857 B1
(45) Date of Patent: *Sep. 21, 2021

(54) SYSTEM AND METHOD FOR OBJECT FALLING AND OVERBOARDING INCIDENT DETECTION

(71) Applicant: PureTech Systems Inc., Phoenix, AZ (US)

(72) Inventors: Fereydoun Maali, Scottsdale, AZ (US); Marvin Wade Barnes, Glendale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/729,109

(22) Filed: Dec. 27, 2019

Related U.S. Application Data

(63) Continuation-in-part of application No. 15/430,326, filed on Feb. 10, 2017, which is a continuation of application No. 14/871,638, filed on Sep. 30, 2015, now Pat. No. 9,569,671.

(60) Provisional application No. 62/057,639, filed on Sep. 30, 2014.

(51) Int. Cl.
| | |
|---|---|
| *H04N 5/77* | (2006.01) |
| *G06K 9/00* | (2006.01) |
| *H04N 5/247* | (2006.01) |
| *H04N 5/91* | (2006.01) |
| *H04N 5/33* | (2006.01) |
| *H04N 7/18* | (2006.01) |
| *G06T 7/292* | (2017.01) |
| *G06T 7/246* | (2017.01) |
| *G06K 9/20* | (2006.01) |
| *G06T 7/00* | (2017.01) |

(52) U.S. Cl.
CPC ..... *G06K 9/00758* (2013.01); *G06K 9/00624* (2013.01); *G06K 9/209* (2013.01); *G06T 7/00* (2013.01); *G06T 7/246* (2017.01); *G06T 7/292* (2017.01); *H04N 5/247* (2013.01); *H04N 5/33* (2013.01); *H04N 5/77* (2013.01); *H04N 5/91* (2013.01); *H04N 7/181* (2013.01); *G06K 2009/00738* (2013.01); *G06T 2207/30252* (2013.01)

(58) Field of Classification Search
USPC .................................................. 386/223, 248
See application file for complete search history.

(56) References Cited

U.S. PATENT DOCUMENTS

| | | | | |
|---|---|---|---|---|
| 7,502,048 | B2 * | 3/2009 | Okamoto | B60R 1/00 348/148 |
| 7,855,654 | B2 * | 12/2010 | Katz | G08B 21/088 340/573.6 |
| 10,458,098 | B2 * | 10/2019 | Baeumchen | H04N 5/2253 |
| 10,816,939 | B1 * | 10/2020 | Coleman | G01S 7/00 |

(Continued)

*Primary Examiner* — Nigar Chowdhury
(74) *Attorney, Agent, or Firm* — Thomas W. Galvani, P.C.; Thomas W. Galvani

(57) ABSTRACT

A system and method detects falling incidents on structures such as cruise vessels, oil rigs, overpasses, and buildings, and also detects overboarding movements onto structures such as cargo ships. The system includes at least two opposed imaging devices which record video streams of a detection cuboid within an overlapping region of view volumes for the imaging devices. The imaging devices monitor objects that pass through the cuboid. Identified objects within the video streams are paired, their conformance is determined, and real-world information such as size, trajectory, and location is determined.

20 Claims, 11 Drawing Sheets

(56) References Cited

U.S. PATENT DOCUMENTS

| | | | |
|---|---|---|---|
| 2003/0020808 A1* | 1/2003 | Luke | G06T 7/20 348/47 |
| 2005/0015286 A1* | 1/2005 | Rudnik | H04N 5/765 348/143 |
| 2005/0078852 A1* | 4/2005 | Buehler | G06K 9/00778 382/103 |
| 2008/0297360 A1* | 12/2008 | Knox | G01S 7/4873 340/628 |
| 2009/0096867 A1* | 4/2009 | Skjelten | G01S 13/937 348/113 |
| 2010/0309315 A1* | 12/2010 | Hogasten | H04N 5/332 348/164 |
| 2011/0068938 A1* | 3/2011 | Witzel | G01S 1/70 340/600 |
| 2011/0188744 A1* | 8/2011 | Sun | H04N 5/2355 382/162 |
| 2012/0123563 A1* | 5/2012 | Drinkard | F16P 3/142 700/13 |
| 2012/0224063 A1* | 9/2012 | Terre | H04N 7/183 348/148 |
| 2012/0229282 A1* | 9/2012 | Zagami | H04N 7/18 340/573.6 |
| 2013/0169809 A1* | 7/2013 | Grignan | G08B 21/08 348/148 |
| 2013/0271301 A1* | 10/2013 | Kabel | B63B 79/10 340/987 |
| 2013/0328867 A1* | 12/2013 | Jung | G01C 21/3647 345/419 |
| 2014/0168065 A1* | 6/2014 | Huang | G06K 9/00355 345/156 |
| 2014/0267733 A1* | 9/2014 | Wu | G08G 1/054 348/149 |
| 2014/0294361 A1* | 10/2014 | Acharya | G06T 17/00 386/241 |
| 2014/0313343 A1* | 10/2014 | Frank | G06T 7/70 348/164 |
| 2015/0226575 A1* | 8/2015 | Rambo | G05D 1/101 701/523 |

* cited by examiner

SYSTEM AND METHOD FOR OBJECT FALLING AND OVERBOARDING INCIDENT DETECTION

CROSS-REFERENCE TO RELATED APPLICATIONS

This application is a continuation-in-part of and claims the benefit of prior U.S. patent application Ser. No. 15/430,326, filed Feb. 10, 2017, which is a continuation of and claims the benefit of prior U.S. patent application Ser. No. 14/871,638, filed Sep. 30, 2015 and issuing as U.S. Pat. No. 9,569,671 on Feb. 14, 2017, which claimed the benefit of prior U.S. Patent Application No. 62/057,639, filed Sep. 30, 2014, all of which are hereby incorporated by reference.

FIELD OF THE INVENTION

The present invention relates generally to image processing and computer vision and more particularly to man overboard detection systems.

BACKGROUND OF THE INVENTION

"Man overboards"—the event of a person falling from some height into the water, are serious concerns. There are many elements which make man overboard events dangerous. They often occur under adverse conditions, such as at night or in high seas. If the air or water temperature is cold, a more than temporary exposure can lead to hypothermia and death. If the fall is from a great height, such as the top of a cruise vessel or oil platform, the fall can injure, knock unconscious, or even kill the fall victim. For reasons such as these, hobbyist, commercial, and military vessels all have protocols for rescuing people who have fallen into the water. However, given the conditions in which a man overboard event happens, protocols are no substitute for immediate detection and speed of recovery.

The incidence of man overboard events on ocean-going passenger cruise vessels has been of such increasing concern recently that it led to a Congressional mandate. In 2010, Congress passed the Cruise Vessel Safety and Security Act ("CVSSA") to address the issue of properly detecting persons who fall overboard. The CVSSA requires that "the vessel shall integrate technology that can be used for capturing images of passengers or detecting passengers who have fallen overboard, to the extent that such technology is available."

Such technology is virtually non-existent, and where extant, is crude at best. Man overboard detection systems are confronted with the formidable challenges of being automatic or semi-automatic, performing in and out of daylight, and operating with high levels of certainty and extremely low false alarm rates at all times and in all waters. Moreover, they must perform under adverse weather conditions and cope with at least moderate vessel movement such as pitching and listing.

Further, such systems are necessary not just on ships but on other structures such as oil rigs, overpasses, and buildings—anywhere a fall could occur. And further still, because such movement is vertical movement along a structure, such systems would be desirable on cargo ships to issue alerts of pirates hostile-boarding, onboarding, or overboarding to hijack a ship. An improved system and method for vertical movement along a structure is needed.

SUMMARY OF THE INVENTION

A method of detecting movement along a structure above a floor comprises providing first and second imaging devices contemporaneously recording first and second video streams of a detection volume. The detection volume extends upwardly from above the floor and has an inner boundary which extends along a vertical plane which is registered with an outer edge of the structure. The method includes monitoring an object in both the first and second video streams while the object is actively moving vertically along the structure and in the detection volume, as well as determining first and second characteristics of the object from the first and second video streams, respectively. The method further includes comparing the first and second characteristics and identifying a movement event in response to a conforming comparison.

The above provides the reader with a very brief summary of some embodiments described below. Simplifications and omissions are made, and the summary is not intended to limit or define in any way the scope of the invention or key aspects thereof. Rather, this brief summary merely introduces the reader to some aspects of some embodiments in preparation for the detailed description that follows.

BRIEF DESCRIPTION OF THE DRAWINGS

Referring to the drawings.

DETAILED DESCRIPTION

Figure 1:
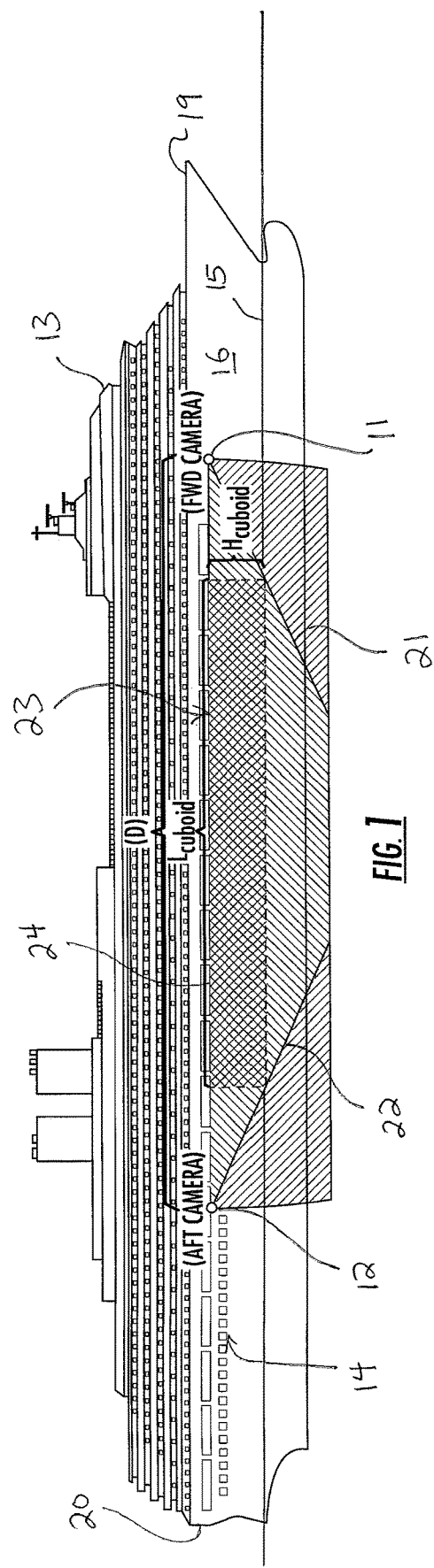
FIG. 1 is a side elevation view of a vessel showing camera coverage and detection cuboids of a system for man overboard incident detection on the vessel.
Figure 2:
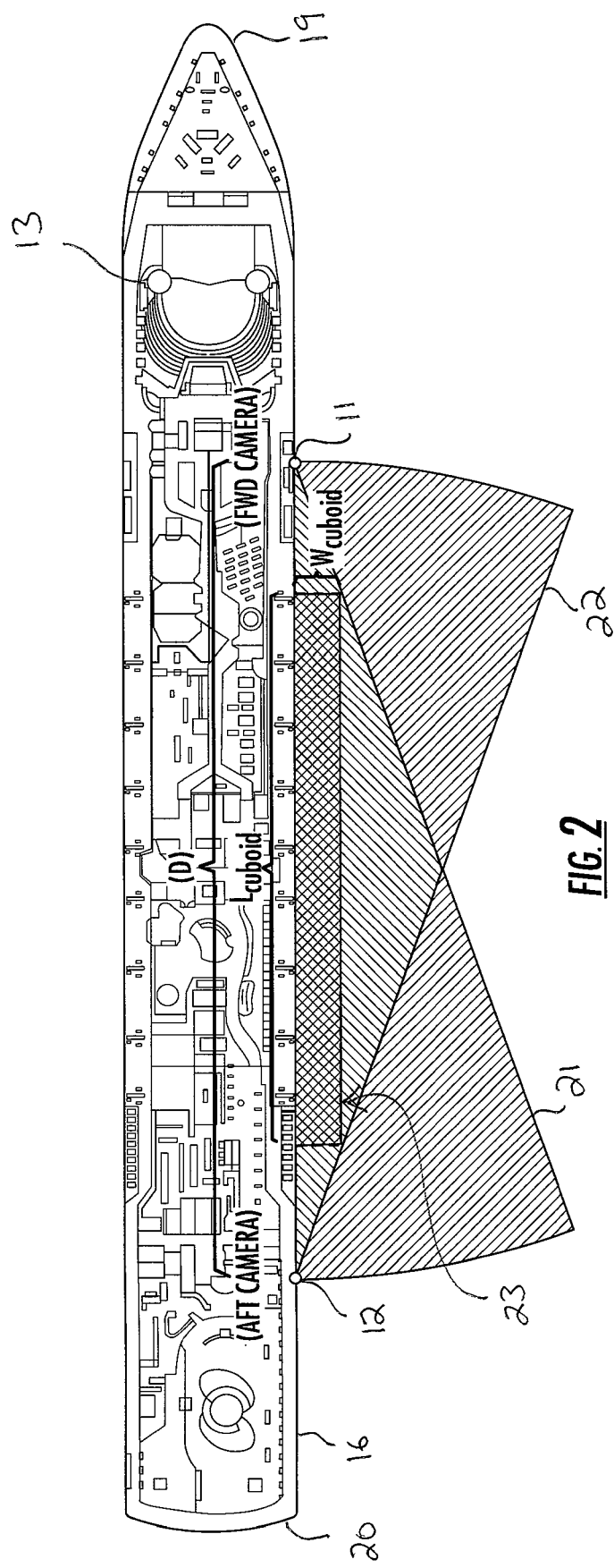
FIG. 2 is a top plan view of the vessel showing the camera coverage and detection cuboids.
Figure 3:
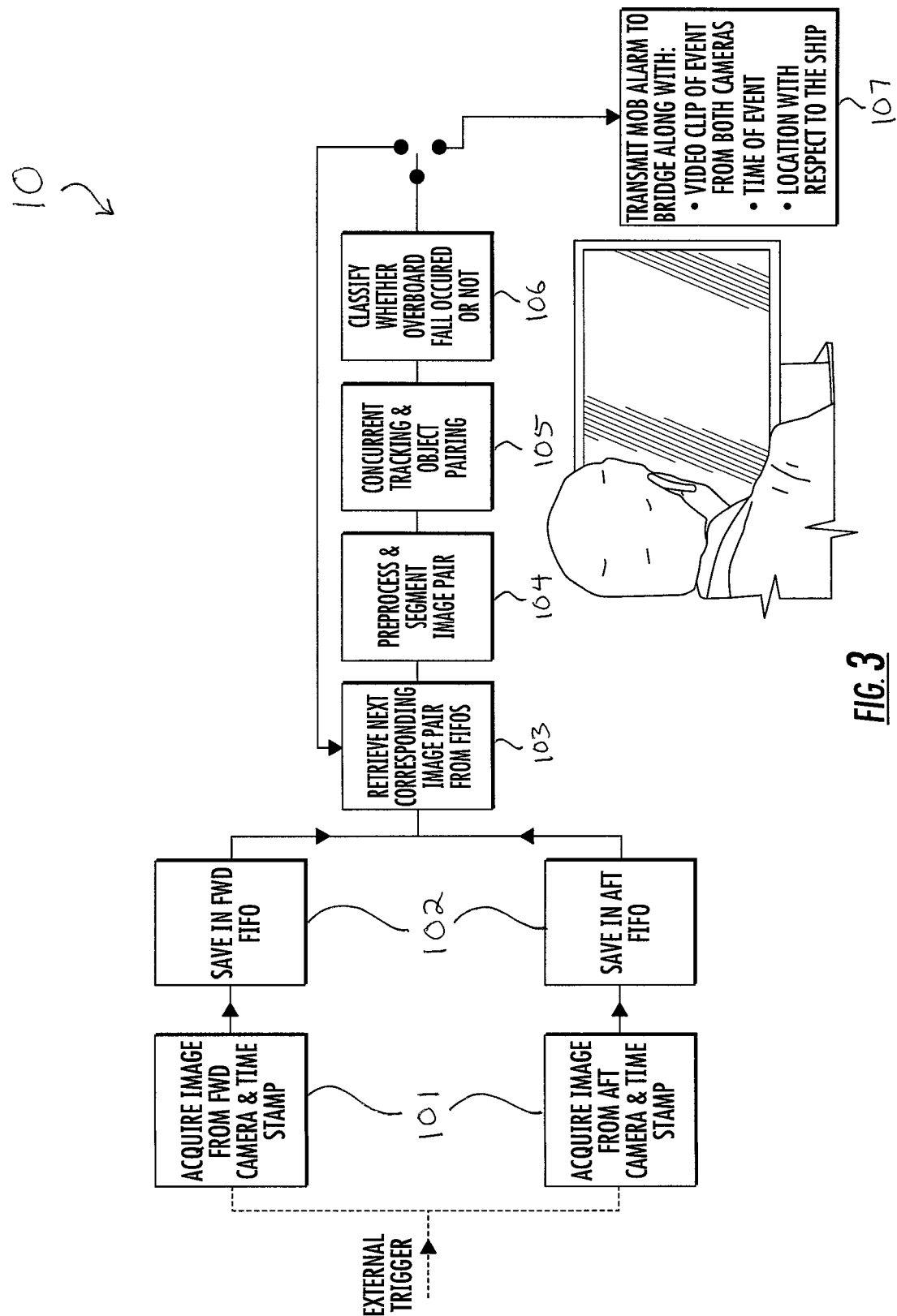
FIG. 3 is a functional block diagram showing steps of the system.

Reference now is made to the drawings, in which the same reference characters are used throughout the different figures to designate the same elements. To address man overboard ("MOB") incidents on cruise vessels, oil platforms, and other above-water structures, an MOB incident detection system 10 is disclosed herein and illustrated in the various drawings. FIG. 3 shows a functional block diagram illustrating steps of the system 10. As shown in FIGS. 1 and 2, the system 10 uses at least two opposed imaging devices or video cameras 11 and 12 mounted to a vessel 13. The cameras 11 and 12 are located and oriented in an opposed fashion so as to view and image the last portion of a fall. Any object falling from the vessel 13, irrespective of from which deck the falls begins, will necessarily pass a lowest deck 14. The cameras 11 and 12 are thus placed to capture and image outside of the vessel 13 from the lowest deck 14 down to a floor or waterline 15. This also maximizes the sensory resolution of the cameras 11 and 12 on the object. By concentrating the cameras 11 and 12 in such manner, the detection resolution of each camera 11 and 12 is spread over a volume that all falls must pass through. Hence, the number of pixels on a falling object (or "pixels on target" or "POT")

is maximized for each of such opposing camera pairs while also ensuring that a necessary and sufficient number of snapshots are captured of the fall. This allows the system 10 to make a reliable determination as to whether an MOB event has taken place or not. Further, by vertically limiting the detection volume to this extent, the system 10 can calculate monitoring time—or fall time—and measure speed at the ceiling of the detection volume and at the waterline, and determine from which deck the fall originated, which information is useful for the crew of the vessel 13 when conducting an investigation.

Briefly and generally, salient elements, features, and characteristics of a preferred embodiment of the MOB incident detection system 10 include, but are not limited to:
  i) A continuous series of opposing video camera pairs located and oriented to view and image the last portion of any and falls;
  ii) A method of exploiting such camera pair to transform image space into world space, thereby leading to insights into the real-world object sizes and location, the latter determined in cooperation with the ship's global navigation satellite system or GPS system;
  iii) A method of seeking conformance of objects in both camera views through the height and width of bounding boxes for the objects;
  iv) A method of transforming image space into world space as in (ii), above, to track and compare segments of a fall trajectory to determine a man overboard event; and
  v) Leveraging information gathered in (ii) and (iii) to qualify the determination made in (iv).

The above items are not an exhaustive list of features of the system 10, but describe generally some of the features to better prepare the reader with the description herein. It is noted here that, throughout this description, the term "image space" is used to mean the space, or coordinate system for the space, imaged by a camera. Likewise, "world space" is the space, or coordinate system for the space, which is the real world. For example, an object in image space may have a height of ten pixels, while, that height may correspond to a height of six feet in world space. Indeed, a world coordinate system useful in (ii) and (iv) above is a three-dimensional Cartesian coordinate system attached to the side of the vessel 13 with the origin located between the opposing pair of cameras 11 and 12 at the level of the opposing pair of cameras 11 and 12.

The system 10 leverages multiple cues to reliably recognize an MOB event. Such cues include adherence to an expected world space fall path or trajectory, time-stamped speed and acceleration values for an object, and world space size determinations.

Referring now to FIGS. 1 and 2, the system 10 is described in the context of an exemplary vessel 10 equipped with the cameras 11 and 12. The example cruise vessel 10 has nine passenger decks from which overboard falls could initiate. The lowest deck, Deck 3, is 12 meters (39 feet) above the waterline 15 while the highest deck, Deck 11, is 33 meters (108 feet) above waterline 15. Deck 3 is the lowest deck from which a fall could initiate as there are no decks below Deck 3 which also have access to an exterior 16 of the vessel 10. Correspondingly, in this description, it is understood that the term "deck" is used to mean only those levels from which a fall could actually occur because such decks provide access to the exterior 16. The exterior 16 has an outer edge, which is the outboard-most portion of the exterior at the deck 14. FIGS. 1 and 2 show a starboard side of the vessel 10.

The cameras 11 and 12 are mounted to the exterior 16 of the vessel 10, either directly or on a pole or other mounting platform. The camera 11 is a forward camera because it is mounted forward of the camera 12 and is toward the bow 19 of the vessel 10. The camera 11 is oriented aft, toward the camera 12. The camera 12 is an aft camera because it is mounted rearward of the camera 11 and is toward the stern 20 of the vessel 10. The camera 12 is oriented fore, toward the camera 11. Each of the cameras 11 and 12 is preferably a VGA (640×480) resolution thermal video camera. Thermal cameras are advantageous within the system 10 because they are passive, a feature not met by visible-light cameras when operating at dark hours or by LIDAR sensors in an opposed arrangement without additional preparatory steps. The cameras 11 and 12 are both rotated ninety degrees, so that each has their horizontal field of view ("HFOV") oriented vertically and their vertical field of view ("VFOV") oriented horizontally, when the vessel 10 demonstrates zero pitch and roll. In most cameras, the HFOV is typically the larger field of view, and so the rotated orientation provides a larger field of view vertically than horizontally. This rotated orientation allows the system 10 to more frequently meet vertical spatial coverage requirements between Deck 3 and the waterline 15 without unduly limited horizontal spatial coverage requirements, as will be described. This rotated orientation also sets scan-line functionality in a vertical direction with respect to the vessel 10; the HFOV of each camera 11 and 12 is aligned with the scan line, and the VFOV of each camera 11 and 12 is perpendicular to the scan line.

Each camera 11 and 12 has a pyramidal view volume which images in the field of view. Camera 11 has a view volume 21 extending aft, and camera 12 has a view volume 22 extending fore. The view volumes 21 and 22 overlap, as shown in FIGS. 1 and 2. Within this overlap, a detection cuboid 23 is established. The cuboid 23 occupies a portion of the overlap, and defines an MOB detection volume for the pair of cameras 11 and 12. Different camera characteristics and arrangements will cause varying amounts of the overlap to be occupied by the cuboid 23. In some embodiments, the cameras 11 and 12 have different angular fields of view, and in other embodiments, additional cameras with different angular fields of view are placed outside the cameras 11 and 12 to augment a detection cuboid 23 formed by view volumes 21 and 22 of the cameras 11 and 12.

The cuboid 23 is defined by several boundaries. Referring particularly to FIG. 1, the cuboid 23 has a ceiling 24 and an opposed floor or base 24. The ceiling 24 is an upper limit defined by, and thus aligned with and extends along, the upper boundary of each view volume 21 and 22. The cameras 11 and 12 are oriented toward each other but also downwardly at an angle, so that the view volumes 21 and 22 are generally angled downwardly. As such, the upper boundaries of each view volume 21 and 22 are coincident and define the ceiling 24 of the cuboid 23. Opposed from the ceiling 24 is the floor or base 25, which is defined here by the waterline 15. Thus, the cuboid 23 extends vertically along a height $H_{cuboid}$ from the level of the cameras 11 and 12, at the lowest deck 14, to the waterline 15.

The cuboid 23 also has a length $L_{cuboid}$ aligned between the bow 19 and the stern 20. The length $L_{cuboid}$ of the cuboid 23 will vary as needed to satisfy the length criterion of the cuboid 23, as will be described herein. However, the length $L_{cuboid}$ of the cuboid 23 extends from a vertical plane at one end defined by the intersection of the view volume 21 with the waterline 15 and at the other end defined by the intersection of the opposed view volume 22 with the waterline 15. The cuboid length $L_{cuboid}$ shall not be so great that it forces either camera 11 or 12 to detect a target beyond its detection range. More specifically, the cuboid length $L_{cuboid}$ shall in part be governed by the minimum required POT; the cuboid length $L_{cuboid}$ shall not be so great that the target to be detected is smaller than the minimum required POT.

Referring now particularly to FIG. 2, the cuboid 23 has a width $W_{cuboid}$ extending outwardly, or as it is defined now, "outboard" of the vessel 13 from the exterior 16. On the inner side of the cuboid 23, the cuboid 23 is defined by a vertical plane against the exterior 16 of the starboard side of the vessel 13, or coincident with the exterior 16 of the vessel 13. The cuboid width $W_{cuboid}$ will vary in correspondence with the cuboid length $L_{cuboid}$ as long as it is effective despite a potential maximum expected ship list of nine degrees. The cuboid length $L_{cuboid}$ can be shortened if an increased cuboid width $W_{cuboid}$ is needed to accommodate ship list.

The cuboid length $L_{cuboid}$ shall be an order of magnitude larger than each of the cuboid width $W_{cuboid}$ and cuboid height $H_{cuboid}$ (150 meters, 12 meters, and 8 meters, respectively, for instance).

The various dimensions of the cuboid are determined according to:

$$W_{cuboid} = h_c \cot \alpha \tan \beta \qquad (1),$$

$$H_{cuboid} = h_c \qquad (2), \text{ and}$$

$$L_{cuboid} = D - 2h_c \cot \alpha \qquad (3),$$

where:
$h_c$ is the height of the camera from the waterline 15;
N is the horizontal resolution of the camera 11 or 12;
M is the vertical resolution of the camera 11 or 12;
D is the distance between the cameras 11 and 12;
α is the angular dimension of the HFOV; and
β is the angular dimension of the VFOV.

It is noteworthy that the arrangement of paired opposing cameras 11 and 12 is merely intended to detect overboard falls in the defined cuboid 23 between the cameras 11 and 12, and not outside of or beyond that cuboid 23. The above equations (1), (2), and (3) determine the dimensions of the cuboid 23 assuming a zero ship list angle. Nonetheless, $W_{cuboid}$ as defined above, is applicable for moderate ship lists of preferably between three and five degrees and up to nine degrees on the exemplary vessel 13. Additional coverage can be achieved by the introduction of additional camera pairs and their respective detection cuboids, as FIGS. 4-9 show.

FIG. 3 shows the principal processing stages of the system 10 in the context of a functional block diagram. The broken line input indicates a preference for use of cameras with an external trigger mode when available. Cameras with an external trigger mode will initiate recording contemporaneously, and temporal correlation of corresponding frames from opposing cameras is desired for use in the system 10. Without temporal correlation, frames captured from opposing cameras 11 and 12 are time-stamped upon being digitized in the case of analog cameras, in step 101. It is noted that two of the functional blocks are identified as step 101, because the function specified in step 101 is performed on the images from the aft camera 11 and the aft camera 12. Operating at 30 frames per second ("fps") entails an uncertainty in time of at most 16.5 milliseconds, which is tolerable within the system 10. After time stamping, the video is communicated to a central server on the vessel 13. To avoid undue degradation of the acquired video during communication across long distances between the cameras 11 and 12 and the server, optical fibers are preferably used to transmit the video data. However, if the video for analysis is to be encoded, it is preferably subjected only to intra-frame encoding (such as with MJPEG encoding), and is preferably lossless. A low-compression ratio version of, for example, MJPEG encoding, is used for archival purposes.

The time-stamped frames of the opposing cameras 11 and 12 are next dumped into their respective first-in, first-out memory ("FIFO") buffers at step 102. The sequence of processing steps 103-106 after step 102 continually repeats itself, with each subsequent temporally-corresponding image pair from each of the FIFO memory buffers in step 103. This sequence of operation progresses at a 30 fps rate.

Following step 103, the image pair is preprocessed and segmented in step 104. Preprocessing is the operation of classifying pixels into background and foreground, through a multimodal background model that exploits both intensity and gradient orientation. This operation is described in U.S. patent application Ser. No. 14/210,435, entitled Background Modeling For Fixed, Mobile, and Step-and-State Video Camera Surveillance, with filing date of March 2014, and which is hereby incorporated by reference. Morphological filtering, also described in the '435 application, is performed after classification of pixels.

Segmentation is directed to partitioning the image into meaningful regions. In other words, segmentation partitions the image into clustered sets of foreground pixels which show a degree of cohesion corresponding to sought objects including the number of clustered pixels. When needed, as determined from the appearance of a sufficiently large number of clustered pixels (hereinafter referred to as a "blob" for ease of reference) each representing an object in image space, the processing operation that includes background modeling, pixel classification, and morphological filtering that exploit motion is augmented by an intra-frame segmentation operation. The intra-frame segmentation operation extracts moving or stationary objects from a single image, rather than employing a background model whose construction requires a sequences of images.

To prevent the loss or overlooking of any potential target which may be revealed through segmentation, the system 10 next concurrently intertwines an object pairing operation with a tracking operation, as shown in step 105. Concurrently performing these operations is more demanding on computer processing power, but it does provide increased reliability in determining true MOB events. The use of the detection cuboid 23 allows the process to determine a number of pieces of information about various potential falls. These pieces of information are cues useful in aiding the system 10 in determining whether an MOB incident has occurred or not.

More specifically, for each paired object, the system can determine the following information or cues:
i Approximate world space size of a paired object, as opposed to the apparent image space size of the paired object;
ii) Approximate world space location of a paired object with respect to the pair of opposing cameras 11 and 12, and thus, also with respect to the vessel 13;
iii) Approximate world space speed and acceleration of a paired object. An authentic fall should, in both images, exhibit substantial speed and acceleration predominantly in downward or vertical direction; and
iv) Pairing of track segments in order to derive an approximate trajectory of the fall in world space with respect to the exterior 16 of the vessel 13.

The above cues are then analyzed in the context of a variety of potential falls from the highest and lowest decks in Table 1 below:

TABLE 1

| Source deck number (source of fall) | Height above waterline | Speed* at lowest Deck (i.e. camera) level | Speed* at waterline | Monitored time* |
|---|---|---|---|---|
| 11 | 35 m (115 ft) | 21 m/s (47 mph) | 26 m/s (58 mph) | 0.5 sec (15 frames) |
| 3 | 12 m (40 ft) | 0 | 15 m/s (34 mph) | 1.5 sec (45 frames) |

*Assumes fall in vacuum, though actual falls are only marginally slower.

By comparing the above determined cues with figures such as those presented in Table 1 above, an authentic MOB event can be determined.

Intertwined or concurrent tracking and pairing according to step 105 includes a number of processing steps. The following symbols and variables are used in those processing steps, which are described afterward. Some of these symbols and variables have been defined before but are repeated here to refresh the memory.

$h_{Fall}$ Source deck height above the water line
$h_c$ Camera height
$h_{monitored}$ Monitored height
$\tau_{monitored}$ Computationally-expected monitored time
fps Frame rate
N Horizontal resolution of camera 11 or 12
M Vertical resolution of camera 11 or 12
D Distance between pair of opposed cameras 11 and 12
$\alpha$ Angular HFOV
$\beta$ Angular VFOV
$n_{Fwd}$ Number of pixels claimed or covered by the width of an object in an image captured by the forward camera 11
$m_{Fwd}$ Number of pixels claimed or covered by the height of an object in an image captured by the forward camera 11
$n_{AFT}$ Number of pixels claimed or covered by the width of an object in an image captured by the aft camera 12
$m_{Aft}$ Number of pixels claimed or covered by the height of an object in an image captured by the aft camera 12
$x_{Fwd}$ X-coordinate of origin of a bounding box drawn around an object in an image captured by the forward camera 11
$y_{Fwd}$ Y-coordinate of origin of a bounding box drawn around an object in an image captured by the forward camera 11
$x_{Aft}$ X-coordinate of origin of a bounding box drawn around an object in an image captured by the aft camera 12
$y_{Aft}$ Y-coordinate of origin of a bounding box drawn around an object in an image captured by the aft camera 12
$H_{cuboid}$ Height of cuboid 23
$W_{cuboid}$ Width of cuboid 23
$L_{cuboid}$ Length of cuboid 23
$r_{fn}$ Range based on width of time-stamped paired objects captured by the forward camera 11
$r_{an}$ Range based on width of time-stamped paired objects captured by the aft camera 12
$r_{fm}$ Range based on height of time-stamped paired objects captured by the forward camera 11
$r_{am}$ Range based on height of time-stamped paired objects captured by the aft camera 12
$r_f$ Range from forward camera 11 when a potential pair exhibits range conformance via width and height cues
$r_a$ Range from aft camera 12 when a potential pair exhibits range conformance via width and height cues
$\alpha_f$ Angular subtense of the width of the object captured by the forward camera 11
$\alpha_a$ Angular subtense of the width of the object captured by the aft camera 12
$\beta_f$ Angular subtense of the height of the object captured by the forward camera 11
$\beta_a$ Angular subtense of the height of the object captured by the aft camera 12
$W_t$ World space width of object
$H_t$ World space height of object
$A_t$ World space area of object World space xy coordinates and image space ji coordinates in the pair of opposed cameras 11 and 12 are related according to:

$$L_{Fwd}=x_{Fwd} \text{ and } i_{Fwd}=M-y_{Fwd}-1$$

$$j_{Aft}=N-x_{Aft}-1 \text{ and } i_{Aft}=M-y_{Aft}-1$$

The origins and orientations of the axes are different in world space xy coordinates and image space ji coordinates. The ji axes are located at the respective camera 11 or 12, with the j-axis aligned with the camera scan line towards the opposing camera 12 or 11, and with the i-axis perpendicular to the scan line. In the xy coordinate system, the axes are attached to a top-left corner of the image and extend along the scan line and perpendicular to it, respectively. The following variables are used:

$xo_{Fwd}$ The x component of the object bounding box centroid in xy image coordinates pertaining to the forward camera 11 in object pairing or track point-pair pairing, respectively
$yo_{Fwd}$ They component of the object bounding box centroid in xy image coordinates pertaining to the forward camera 11 in object pairing or track point-pair pairing, respectively
$jo_{Fwd}$ The j component of the object bounding box centroid in ji image coordinates pertaining to the forward camera 11 in object pairing or track point-pair pairing, respectively
$io_{Fwd}$ The i component of the object bounding box centroid in ji image coordinates pertaining to the forward camera 11 in object pairing or track point-pair pairing, respectively
$xo_{Aft}$ The x component of the object bounding box centroid in xy image coordinates pertaining to the aft camera 12 in object pairing or track point-pair pairing, respectively
$yo_{Aft}$ They component of the object bounding box centroid in xy image coordinates pertaining to the aft camera 12 in object pairing or track point-pair pairing, respectively
$jo_{Aft}$ The j component of the object bounding box centroid in ji image coordinates pertaining to the aft camera 12 in object pairing or track point-pair pairing, respectively
$io_{Aft}$ The i component of the object bounding box centroid in ji image coordinates pertaining to the aft camera 12 in object pairing or track point-pair pairing, respectively
$(\iota\kappa\lambda)$ A 3-dimensional Cartesian-coordinate system representing real distances from its origin. The origin of this coordinate system lies at the midpoint of the pair of opposing cameras 11 and 12 at the level of the cameras 11 and 12, with distances measured increasingly positive towards the forward camera 11, and with outboard and downward distances also being measured in positive values. The following variables are used:

$1_{Fwd}$ A component representing real distance from the origin (i.e., from a midpoint between the cameras 11 and 12)

$k_{Fwd}$ A component representing outboard distance from the origin (i.e., from the exterior 16 of the vessel 13)

$\lambda_{Fwd}$ A component representing downward distance from the origin (i.e., from the level of the cameras 11 and 12)

$\iota_{Aft}$ A component representing real distance the origin (i.e., from a midpoint between the cameras 11 and 12)

$k_{Aft}$ A component representing outboard distance from the origin (i.e., from the exterior 16 of the vessel 13)

$\lambda_{Aft}$ A component representing downward distance from the origin (i.e., from the level of the cameras 11 and 12)

$tk_{ptpairTiltFwd}$ Track point-pair tilt angle in image space of the forward camera 11

$tk_{ptpairTiltAft}$ Track point-pair tilt angle in image space of the aft camera 12

Much like $(\iota\kappa\lambda)$, $(\iota_{tr},\kappa_{tr},\lambda_{tr})$ represents a 3-dimensional Cartesian coordinate system representing real distances from the same origin. However, instead of being derived from the width and height of the paired object bounding boxes in pixel space, coordinates in this system are derived from projections of two track segments in image space, along the camera scan line and perpendicular to it, for timestamp-paired images in both opposing cameras 11 and 12. The pairing is done between points in the fall trajectory, or "track points," whose timestamps conform and their underlying blob has survived the initial pruning in the course of segmentation from step 104. The track points are the centroids of the object, or of the bounding box surrounding the objects, in the image space of each of the cameras 11 and 12. Two track points establish a track segment, as they represent a segment of the trajectory of the fall in image space. Thus, for this processing stage, two timestamp-paired images from each camera 11 and 12 are to be tested for conformance. The track point pair need not include immediately preceding and succeeding frames, rather, they may be selected from one frame to variously distant frames in time. Indeed, the track points are paired combinatorially and analyzed to reduce error.

Conforming track segments, when not too close in time, do not exhibit disparate tilt angles $$\tan^{-1}\left(\left|\frac{\delta y}{\delta x}\right|\right).$$

Such conformance can optionally be examined through a Hough-like transform of candidate track points, with each track point pair potentially defining a candidate track segment. Outliers are discarded and the extent of conformity of the survivors is verified. For this operation, the following variables are used:

$(\iota_{tr})_{Fwd}$ A component representing real distance from the origin (i.e., the midpoint between the cameras 11 and 12) toward the forward camera 11;

$(\kappa_{tr})_{Fwd}$ A component representing real outboard distance from the origin toward the forward camera 11;

$(\lambda_{tr})_{Fwd}$ A component representing real downward distance from the origin toward the forward camera 11;

$\beta o_{Fwd}$ Angular subtense of outboard distance manifested by a blob imaged by the forward camera 11, or equally, that pertains to two track points (i.e., a track segment) at different frames;

$\beta o_{Aft}$ Angular subtense of outboard distance manifested by a blob as observed by the aft camera 12, or equally, that pertains to two track points (i.e., a track segment) at different frames;

$\alpha o_{Fwd}$ Angular subtense of downward distance manifested by a blob as observed by the forward camera 11, or equally, that pertains to two track points (i.e., a track segment) at different frames; and $\alpha o_{Aft}$ Angular subtense of downward distance manifested by a blob as observed by the aft camera 12, or equally, that pertains to two track points (i.e, a track segment) at different frames.

Concurrent tracking and pairing as shown in step 105 of FIG. 3 follows image segmentation, which entails an implicit pruning (i.e. discarding of blobs which defy, say, expected size constraints, or a combination of size and location constrains, or when the opposing timestamp consistent frame does not exhibit any blob).

To reduce the vulnerability of processing to erroneous objects that may survive the segmentation process, the methodology offers multiple cues to be exploited to meet such occurrences. Such erroneous objects could include a plane in the distance, a bolt of water jettisoned from the deck, a tugboat pulling alongside the vessel 13, or a passenger boarding the vessel 13 on a gangway far below. First, the spans or dimensions of a bounding box for an object are compared. Second, those spans or dimensions are transformed into world space sizes and compared to estimated real object width and height and, hence, size. Third, pairing of track point pairs (i.e., a track segment) in timestamp-paired frames from the opposing cameras 11 and 12 yields additional cues that can be exploited in discarding erroneous blobs.

When pairing objects through their appearance in the cameras 11 and 12, the width and height of the bounding boxes surrounding the objects are used to arrive at ranges of the objects from the cameras 11 and 12. The width and height of the bounding boxes are measured in pixels along the scan line of the cameras 11 and 12 and perpendicular to the scan line. This information, when combined with the known subtending angles for the width and height, allows the system 10 to determine the world space ranges. For authentic objects, these ranges should conform to an estimate, and should be less than the inter-camera distance D. Nevertheless, the range is merely used as a cue, with classification in step 106 of FIG. 3 being where the ultimate determination of whether an MOB event has occurred or not. In step 106, multiple cues are compiled, such as object width, object height, track point pairing, and others.

The ranges are calculated according to the following algorithms. The range based on the width of a bounding box of an object in timestamp-paired frames from the forward camera 11 is determined by:

$$r_{fn} = \frac{n_{Aft}}{n_{Fwd} + n_{Aft}} \cdot D. \tag{4}$$

The range based on the width of a bounding box of an object in timestamp-paired frames from the aft camera 12 is determined by:

$$r_{an} = \frac{n_{Fwd}}{n_{Fwd} + n_{Aft}} \cdot D. \tag{5}$$

The range based on the height of a bounding box of an object in timestamp-paired frames from the forward camera 11 is determined by:

$$r_{fm} = \frac{m_{Aft}}{m_{Fwd} + m_{Aft}} \cdot D. \tag{6}$$

The range based on the height of a bounding box of an object in timestamp-paired frames from the aft camera 12 is determined by:

$$r_{am} = \frac{m_{Fwd}}{m_{Fwd} + m_{Aft}} \cdot D. \tag{7}$$

The above equations (4)-(7) rely on the following relationships:

$$\alpha_{fm} \approx \frac{n_{Fwd}}{N} \cdot \alpha, \tag{8}$$

$$\alpha_{an} \approx \frac{n_{Aft}}{N} \cdot \alpha, \tag{9}$$

$$\beta_{fm} \approx \frac{m_{Fwd}}{M} \cdot \beta, \tag{10}$$

and $$\beta_{am} \approx \frac{m_{Aft}}{M} \cdot \beta. \tag{11}$$

The cameras 11 and 12 will record approximately the same height. With an approximately similar height, the following equation is written:

$$\beta_a r_a \approx \beta_f r_f \tag{12}$$

Further, the cameras 11 and 12 will also generally capture approximately the same width. With an approximately similar width, the following equation is written:

$$\alpha_a r_a \approx \alpha_f r_f \tag{13}$$

Equations (12) and (13) apply equally to opposing cameras of the same fields of view as they do to opposing cameras of different fields of view, so long as the cameras put a minimum number of pixels on the object without the requirement of their detection range extending entirely to the opposing camera. Hence, in this fashion, blind view volumes in the immediate vicinity of each camera in an opposing-camera pair are addressed. Because the object must be between the forward camera 11 and the aft camera 12, the following height-derived range and the width-derived range must satisfy the following constraint:

$$r_a + r_f \approx D \tag{14}$$

Further, conformance is determined when the height-derived range and the width-derived range deviate from each other by no more than a user-defined tolerable extent.

Substituting for $\beta_f$ and $\beta_f$ in (12) from (10) and (11) yields a relationship for the height:

$$\frac{m_{Aft}}{M} \cdot \beta \cdot r_a \approx \frac{m_{Fwd}}{M} \cdot \beta \cdot r_f, \tag{15}$$

or, more simply:

$$m_{Aft} \cdot r_a \approx m_{Fwd} \cdot r_f \tag{16}$$

Equation (16) states that the number of pixels claimed or covered by the height of a bounding box for a falling object in a corresponding image pair from the cameras 11 and 12 is approximately inversely proportional to their ranges from the respective camera.

Similarly, for width:

$$n_{Aft} \cdot r_a \approx n_{Fwd} \cdot r_f \tag{17}$$

Finally, by substituting for $r_f$ in (14) and rearranging, equations for forward camera 11-based range and aft camera 12-based range are obtained from object width as follows:

$$r_{fn} \approx \frac{n_{Aft}}{n_{Aft} + n_{Fwd}} \cdot D, \tag{18}$$

and $$r_{an} \approx \frac{n_{Fwd}}{n_{Aft} + n_{Fwd}} \cdot D. \tag{19}$$

Similarly, equations for forward camera 11-based range and aft camera 12-based range are obtained from object height as follows:

$$r_{fm} \approx \frac{m_{Aft}}{m_{Aft} + m_{Fwd}} \cdot D, \tag{20}$$

and $$r_{am} \approx \frac{m_{Fwd}}{m_{Aft} + m_{Fwd}} \cdot D. \tag{21}$$

A conforming paired object as observed from the forward and aft cameras 11 and 12 must yield approximately the same ranges from corresponding cameras 11 and 12 based on both object width and height. If the object does not demonstrate conformance, the object is either dismissed as not being due to the same actual object, or is negatively scored. On the other hand, if the ranges conform, then aggregate ranges from the forward and aft cameras 11 and 12 for that object are computed with equations (20) and (21). These computed ranges, in turn, are used to estimate world space width and height of the object, which is then compared to the expected width and height of a falling person. It should be remembered that a falling person may exhibit different widths and heights due to their presented aspects to the camera pair, and due to movement and rotation of the person during the fall.

The rigidity of dismissal criteria may in some cases be relaxed when considering several contributing point pairs across different frames. Such dismissal criteria may be relegated to a scoring mechanism which considers potential different track point pairs across the time of descent.

In step 107, pertinent information is provided to the bridge of the vessel 13 to assist in a recovery operation. The system determines the location of the object. The location in the 3-dimensional Cartesian coordinate system ($\iota\kappa\lambda$) is determined.

The component along the $\iota$-axis (i.e., along the camera line) is given by:

$$\iota \approx \frac{\iota_{Fwd} + \iota_{Aft}}{2}, \quad (22)$$

Where $$\iota_{Fwd} \approx \frac{D}{2} - r_f, \quad (23)$$

and $$\iota_{Aft} \approx r_f - \frac{D}{2}. \quad (24)$$

The component along the k-axis (i.e., the real outward distance from the exterior 16 of the vessel 13) is given by:

$$\kappa \approx \frac{k_{Fwd} + k_{Aft}}{2}, \quad (25)$$

where $$\kappa_{Fwd} \approx r_f \times \beta o_{Fwd} \quad (26),$$

$$\kappa_{Aft} \approx r_a \times \beta o_{Fwd} \quad (27), \text{ and where}$$

$$\beta o_{Fwd} \approx \frac{io_{Fwd}}{M} \times \beta, \quad (28)$$

and $$\beta o_{Aft} \approx \frac{io_{Aft}}{M} \times \beta. \quad (29)$$

The downward component of the fall along the λ-axis is given by:

$$\lambda \approx \frac{\lambda_{Fwd} + \lambda_{Aft}}{2}, \quad (30)$$

where $$\lambda_{Fwd} \approx r_f \times \alpha o_{Fwd} \quad (31),$$

$$\lambda_{Aft} \approx r_a \times \alpha o_{Aft} \quad (32), \text{ and where}$$

$$\alpha o_{Fwd} \approx \frac{N - j o_{Fwd}}{N} \times \alpha, \quad (33)$$

and $$\alpha o_{Aft} \approx \frac{N - j o_{Aft}}{N} \times \alpha. \quad (34)$$

The above equations (22)-(34) show that for every conformant object pair, a world space location with respect to the pair of opposed cameras 11 and 12 and, thus, also with respect to the vessel 13, can be determined. Moreover, from a collection of such points, the system 10 determines a trajectory in world space for the fall and assesses the trajectory and the segments thereof to see if they meet an expected trajectory, speed, and acceleration profile of an authentic MOB fall. If they do approximate an expected trajectory, speed, and acceleration profile of an authentic MOB fall, then the system 10 identifies the event as an MOB. The cues then support the determination to increase its reliability.

Much like the manner in which ranges from the paired object width and height are compared, ranges from pairing track segments in opposing cameras 11 and 12 may also be derived and compared for conformance. Comparison is made both along the scan line and perpendicular to the scan line.

First, world space coordinates are derived for conforming track segments:

$$(\iota_{tr})_{Fwd} \approx \frac{\iota_{Fwd} + \iota_{Aft}}{2}, \quad (35)$$

where $$(\iota_{tr})_{Fwd} \approx \frac{D}{2} - r_f, \quad (36)$$

and $$(\iota_{tr})_{Aft} \approx r_f - \frac{D}{2}. \quad (37)$$

The component along the k-axis (i.e., the world space outboard distance from the exterior 16 of the vessel 13) is given by:

$$(\kappa_{tr})_{Fwd} \approx \frac{k_{Fwd} + k_{Aft}}{2}, \quad (38)$$

where $$(\kappa_{tr})_{Fwd} \approx r_f \times \beta o_{Fwd} \quad (39), \text{ and}$$

$$(\kappa_{tr})_{Aft} \approx r_a \times \beta o_{Aft} \quad (40), \text{ and where}$$

$$\beta o_{Fwd} = \frac{io_{Fwd}}{M} \times \beta, \quad (41)$$

and $$\beta o_{Aft} = \frac{io_{Aft}}{M} \times \beta. \quad (42)$$

The downward component of the fall along the λ-axis is given by:

$$(\lambda_{tr})_{Fwd} \approx \frac{\lambda_{Fwd} + \lambda_{Aft}}{2}, \quad (43)$$

where $$(\lambda_{tr})_{Fwd} \approx r_a \times \alpha o_{Fwd} \quad (44), \text{ and}$$

$$(\lambda_{tr})_{Aft} \approx r_a \times \alpha o_{Aft} \quad (45), \text{ and where}$$

$$\alpha o_{Fwd} = \frac{N - j o_{Fwd}}{N} \times \alpha, \quad (46)$$

and $$\alpha o_{Aft} = \frac{N - j o_{Aft}}{N} \times \alpha. \quad (47)$$

The equations above provide the ability to derive conformant track segments and qualify them with conformant width and height (and thus, area) information about the corresponding object. This information, in isolation or combination, is used to provide the necessary attributes to determine whether an MOB event has occurred or not.

While the above disclosure has been made with respect to thermal video cameras, one having ordinary skill in the art will appreciate that under some conditions, visible-light video cameras. In some situations, visible-light video cameras may be sufficient when equipped with infrared illuminators of different wavelengths for dark hours. Appropriate short-pass and long-pass infrared filters would be used to avoid interference with the operation of the opposing cameras. Further, in some cases, an arrangement involving LIDAR sensors, rather than video cameras, may be used as long as the issues raised by their interference is known and accounted for.

Figure 4:
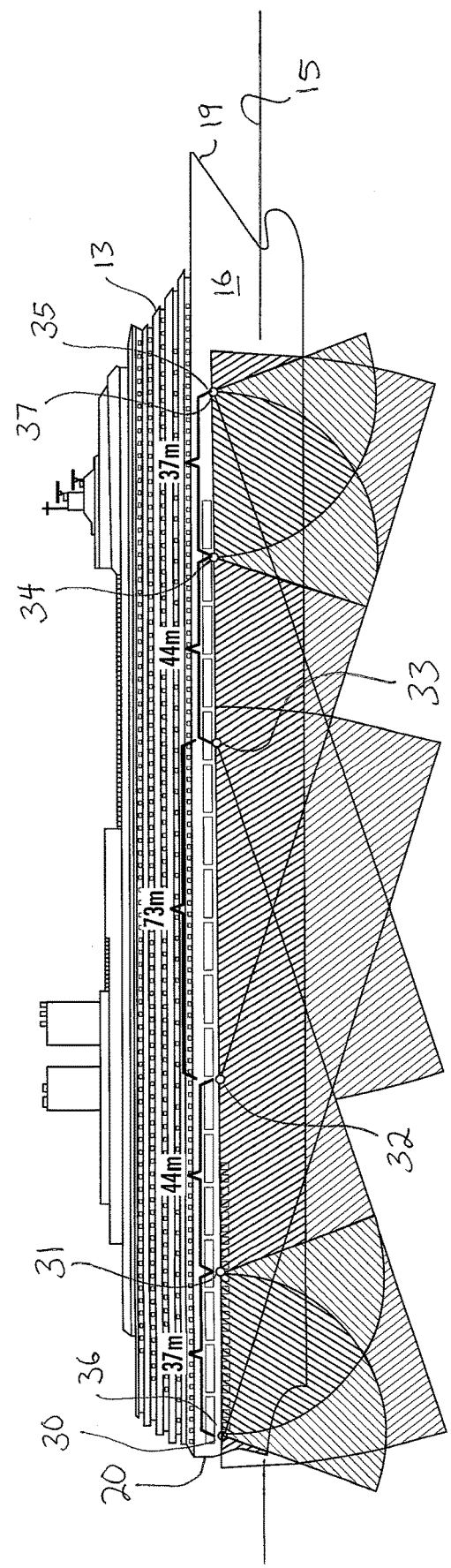
FIGS. 4 and 5 are side elevation views of the vessel showing alternate camera coverage and detection cuboids.

This description has heretofore referred only to the cameras 11 and 12 as exemplary cameras for the system 10. However, the system 10 is not intended to be used with only two cameras. Rather, a preferred embodiment of the system 10 includes cameras mounted around the entire perimeter of the vessel 13 to provide monitoring around the entire perimeter of the vessel 13, rather than a section thereof. As mentioned earlier, additional coverage is achieved by the introduction of additional camera pairs and their respective detection cuboids, as FIGS. 4-9 show. FIG. 4 illustrates the exterior 16 of the starboard side of the vessel 13, which is mounted with a plurality of cameras 30-37. The cameras 30-37 include wide- and narrow-field camera which are chosen, mounted, or oriented for different reasons. The cameras 30-37 form different pairs of cameras as well. However, it is noted that for purposes of this embodiment, pairs are formed only between cameras having identical fields of view and resolutions; the processes described above rely on opposing pairs of identical cameras. Nevertheless, there are many pairs. For instance, because camera 30 is directed toward the bow 19 of the vessel 20, and the camera 31 is directed toward the stern of the vessel 13, and those cameras 30 and 31 have identical characteristics (both cameras 30 and 31 are wide-field, high resolution cameras), they form a pair. Camera 36, which is located proximate to camera 30, has a narrow field of view and is directed forward. Camera 33 and camera 37 (which is located proximate to camera 35) are each directed rearward and each form a pair with camera 36. Thus, the view volumes of the cameras 30-37 overlap and create multiple detection cuboids for different camera pairs. The cameras 36 and 37 are mounted proximate to the cameras 30 and 35, respectively, but instead of having an extremely wide field of view, have a narrow field of view, such as approximately 18°, which provides a different field of view at that location.

Some of the cuboids formed by the various pairs of the cameras 30-37 are contiguous, meaning they are adjacent and located in juxtaposition end-to-end, while other of the cuboids formed by the cameras 30-37 are overlapping, meaning that they extend into or over each other by some portion. Some of the detection cuboids are shown in FIG. 5.

Figure 5:
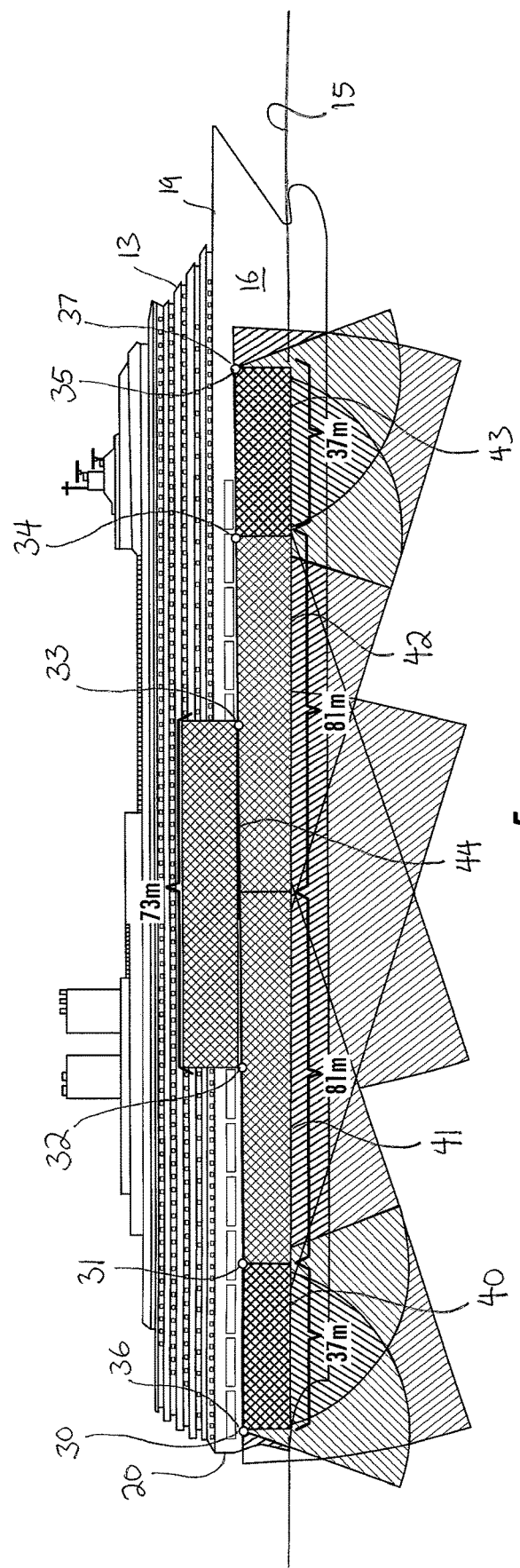

Referring to FIG. 5, a cuboid 40 is formed between the opposed cameras 30 and 31. As can be seen by their view volumes, the cameras 30 and 31 each have an extremely wide field of view, such as 110°. This allows the cuboid 40 to have a very high occupancy, meaning that the cuboid 40 occupies a very large portion of the overlap of the view volumes of the cameras 30 and 31; here, in fact, the cuboid 40 occupies the entire overlap. This is useful proximate to the stern 20 of the vessel 13 where it is difficult to mount a camera. Without extremely wide field-of-view cameras 30 and 31 near the stern 20, the cuboid 40 would be much shorter, and would expose a detection gap, through which a passenger could fall without triggering an MOB alarm.

Closer to the bow 19, a cuboid 43 is formed between the opposed cameras 34 and 35. Like the cameras 30 and 31, the cameras 34 and 35 also have an extremely wide field of view.

Between the cuboids 40 and 43, three cuboids 41, 42, and 44 are formed. The cuboids 41 and 42 are contiguous to each other, and together are contiguous with the cuboids 40 and 43. The cuboid 41 is formed between the forwardly-directed narrow-field camera 36 and the rearwardly-directed camera 33. Similarly, the cuboid 42 is formed between the rearwardly-directed narrow-field camera 37 and the forwardly-directed camera 32. The cuboids 44 and 45 each overlap with the cuboid 44.

The cuboid 44 is formed between the pair of cameras 36 and 37. These cameras 36 and 37 have narrow fields of view but low resolution capabilities compared to the wide field-of-view cameras 30 and 35, allowing for greater ranges with comparable POT as those of the cameras 30 and 35. The cuboid 44 illustrates an overlapping detection volume. The cuboid 44 is shown elevated above the cuboids 41 and 42 for purposes of clarity of the illustration only; in fact, the entirety of the cuboid 42 overlaps portions of the cuboids 41 and 42. The cuboid 44 thus provides redundant monitoring of portions of the cuboids 41 and 42.

Figure 6:
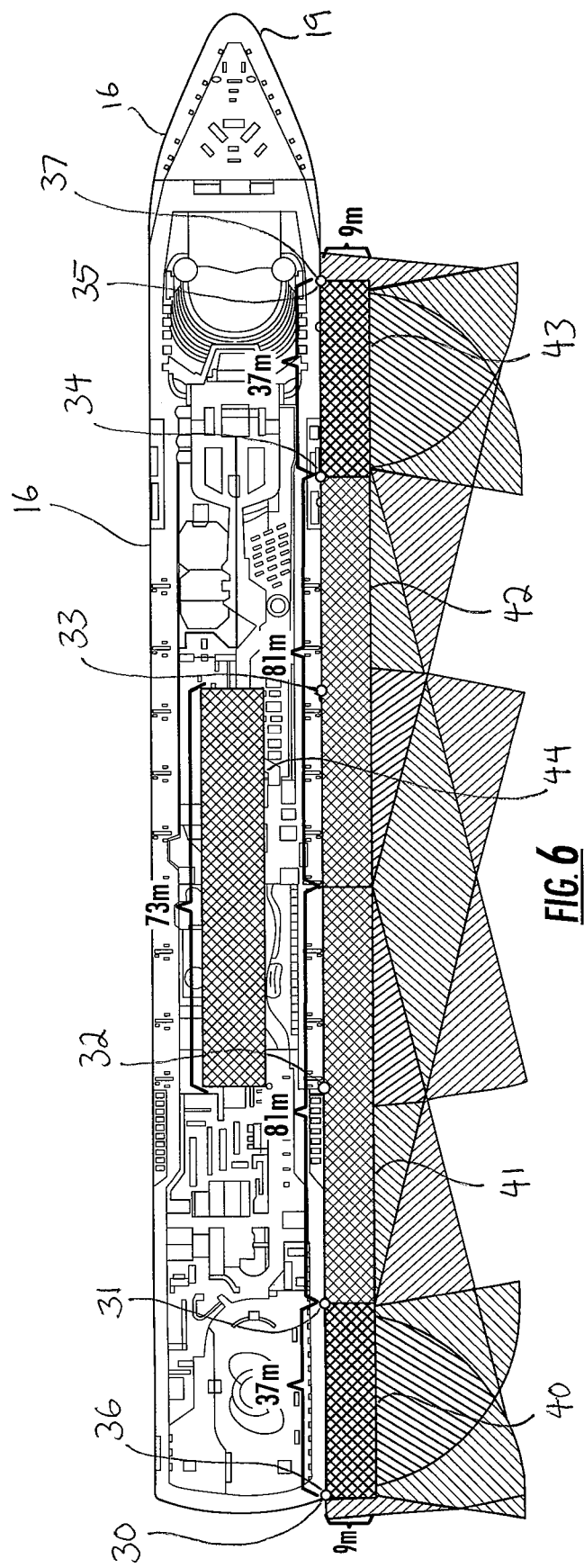
FIG. 6 is a top plan view of the vessel showing the alternate camera coverage and detection cuboids of FIGS. 4 and 5.

Referring now to FIG. 6, the cuboids 40-44 are shown in a top plan view illustrating the detection volumes as they extend outboard from the exterior 16 of the vessel 13. The cuboids 44 is again shown offset for clarity of the illustration.

Figure 7:
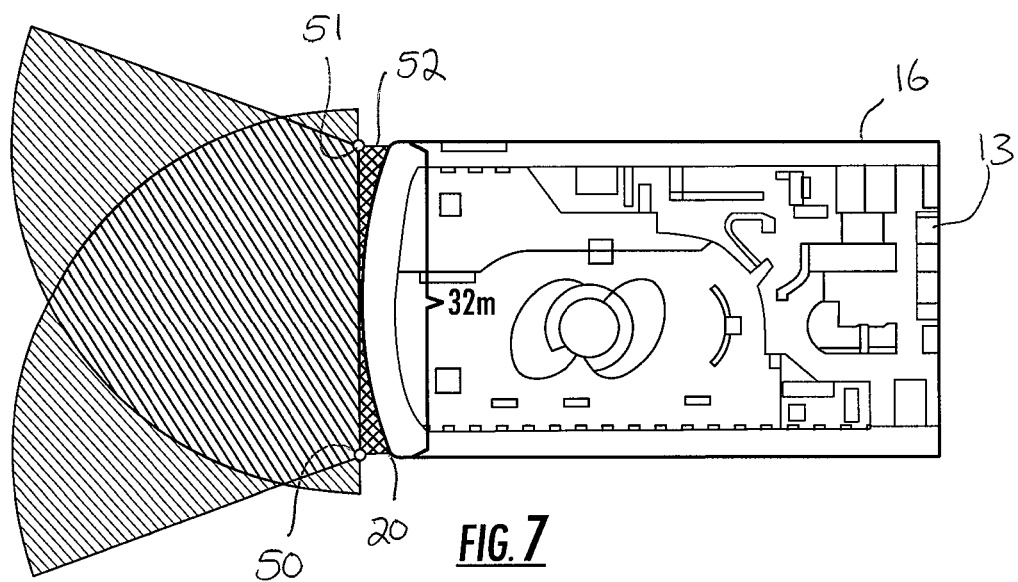
FIGS. 7 and 8 are top plan views of a stern of the vessel showing alternate camera coverage embodiments.
Figure 8:
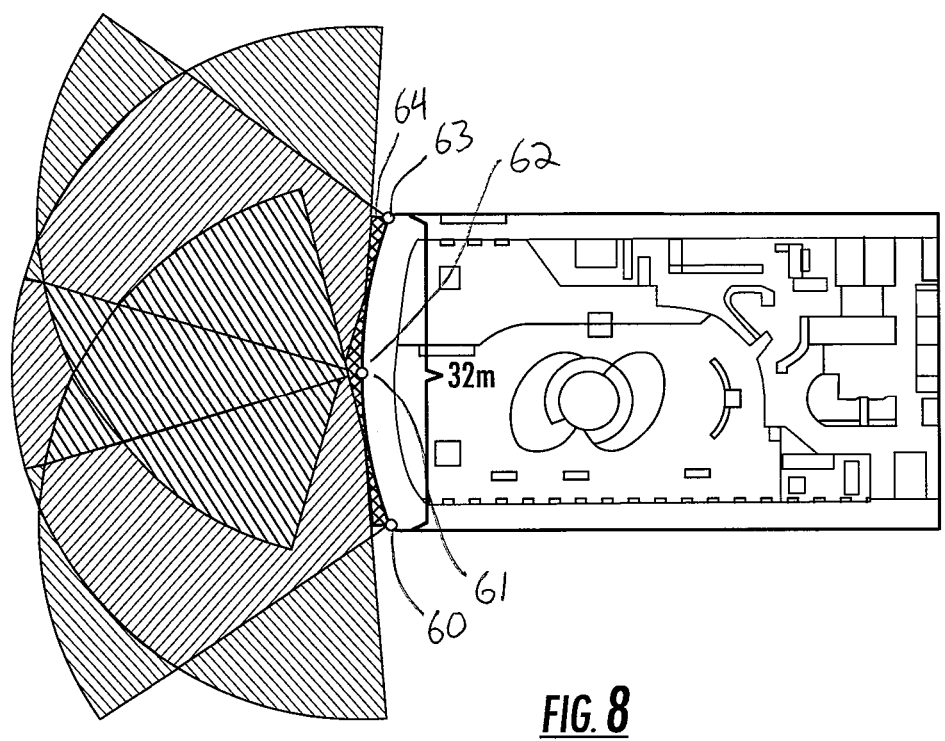

Turning to FIG. 7, the stern 20 of the vessel 13 is shown in top plan view. Two cameras 50 and 51 are mounted just off the stern 20 of the vessel and directed somewhat toward each other. The view volumes of the cameras 50 and 51 are necessarily limited in that they cannot "see around" the stern 20 and are thus limited in coverage by the obstruction of the stern 20 itself. Hence, the leading edges of the view volumes of the cameras 50 and 51 extend across the exterior 16 of the stern 20. This leaves a gap 52 between the view volumes and the stern 20. An alternate camera configuration is shown in FIG. 8 formed by four cameras 60, 61, 62, and 63. The cameras 60 and 63 are mounted at the starboard and port side of the stern 20, respectively, and the cameras 61 and 62 are mounted at the same location therebetween; the cameras 61 and 62 are directed generally away from each other. Even this arrangement creates a gap 64 in the view volumes, albeit smaller than the gap 52 shown in FIG. 7.

Figure 9:
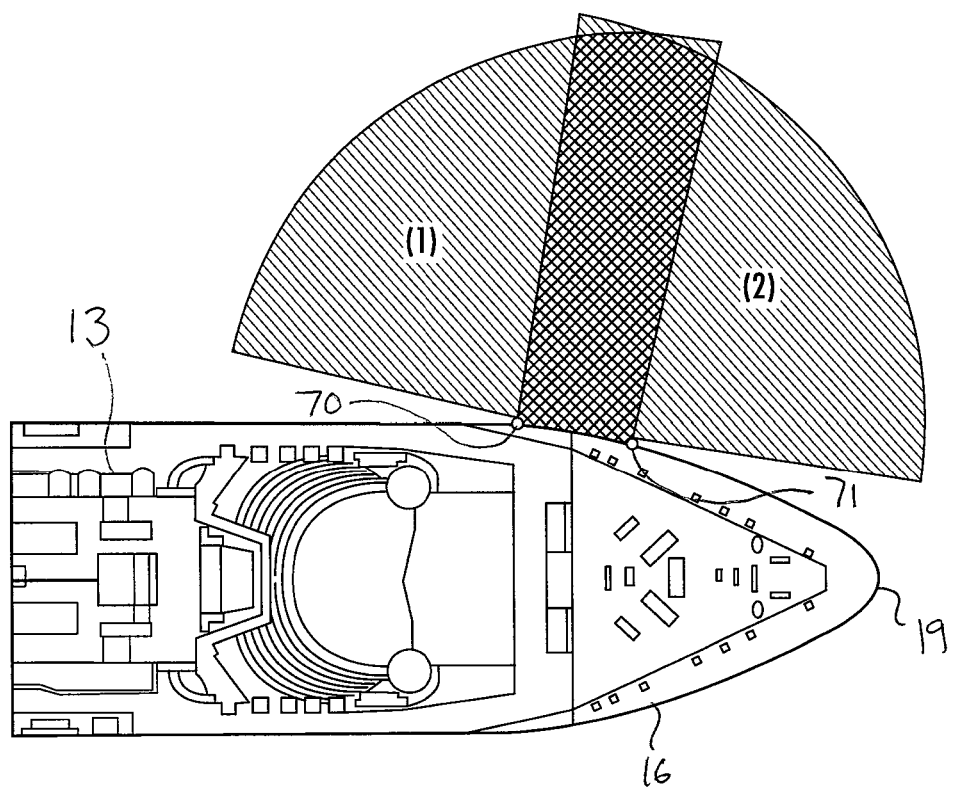
FIG. 9 is a top plan view of a bow of the vessel showing an alternate camera coverage.

Referring now to FIG. 9, a top plan view of the bow 19 illustrates coverage from two cameras 70 and 71. The opposed cameras 70 and 71 are wide-angle cameras mounted apart from each and oriented in a converging fashion. In this embodiment, the cameras 70 and 71 have fields of view of approximately 90°. As is seen in this FIG. 9 and FIGS. 7-8, exterior convex surfaces are demanding in terms of the number and type of cameras needed to cover and monitor the exterior 16.

This description is applicable to imaging devices of all kinds, including but not limited to visual cameras and thermal cameras, as well as cameras of different fields of view and angular fields of view, and also cameras of different resolutions. Moreover, in addition to other novel subject matter described herein, the placement of the imaging devices is novel, and the methodology described herein uniquely exploits that placement. Similarly, the methodology is augmented by a tracking scheme entailing correlation of the track segments of a fall, as recorded by opposing imaging devices. This secures track segments (between pairs of points in the fall trajectory) of sufficient length to reject outliers. In a preferred embodiment, the track segments are selected judiciously based on sufficient temporal and thus spatial intervals between. In other embodiments, the track segments could be selected from consecutive or adjacent points, but this could yield segments giving rise to amplified error. During the fall, locations of the detected fall can then be filtered through application of a Hough transform which suppresses the outliers. Then, the resultant track segments, as detected by opposing cameras, are correlated for conformance. Use of opposing cameras mitigates the risk of exposure to identical noise and artifacts, such as would occur with a stereoptic arrangement of imaging devices (for example, both imaging devices in a stereoptic arrangement would view a ferris wheel in the distance, while in the opposing arrangements described herein, only one imaging device would see the ferris wheel, the other would not, and thus the ferris wheel would be recognized as noise).

Further, the methodology is not reliant on input from active sensors such as radar or lidar, but rather is effective with passive sensors such as thermal cameras. It nonetheless detects and tracks objects falling in three-space with respect to the vessel 13. The vessel 13 monitors its own real-world geographic position, and by corelating the position in three-space with the position of the vessel 13, the method described above determines the real-world location of the object.

Figure 10:
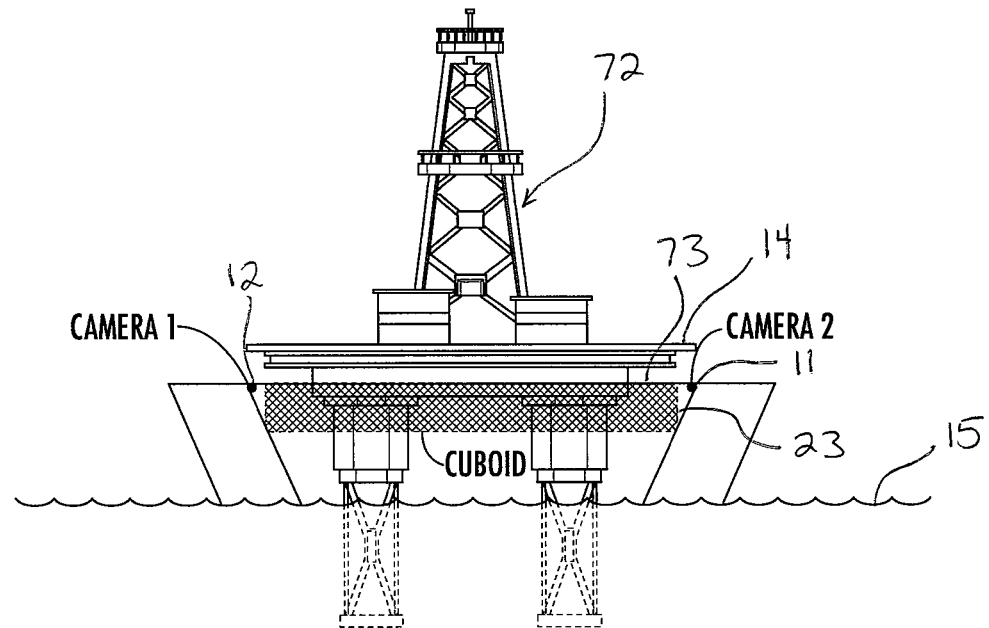
FIGS. 10-13 illustrate embodiments of the system in use on an oil rig, highway overpass, building, and cargo ship.

This description has heretofore referred only to objects falling from a vessel 13. However, the system 10 is not so limited. Indeed, it may be used to detect objects falling from other structures and even objects rising or scaling structures. In short, the system 100 detects movement along a structure. FIGS. 10-13 illustrates various exemplary structures with which the system 10 is also useful. FIG. 10 illustrates an oil rig, FIG. 11 an overpass, FIG. 12 a building, and FIG. 13 a cargo or container ship.

Referring first to FIG. 10, an offshore oil platform or oil rig 72. The two cameras 11 and 12 of the system 100 are mounted in an opposed fashion as on the vessel 13. Indeed, the arrangement of the cameras 11 and 12 is identical to the arrangement on the vessel 13, and one having ordinary skill in the art will readily appreciate such, with the oil rig 72 having a vertical 73 extending vertically downward from its outer edge, similarly to the vertical exterior 16 of the vessel 13. The cuboid 23 is shown in FIG. 10 as extending from the deck 14 (from which a fall would occur) partially down to the waterline 15, however, preferably, the cuboid 23 extends entirely down to the waterline 15, as on the vessel 13. In both ways, the cameras 11 and 12 and the cuboid 23 are arranged to capture and image outside of the oil rig 72 to detect a fall from the deck 14.

Figure 11:
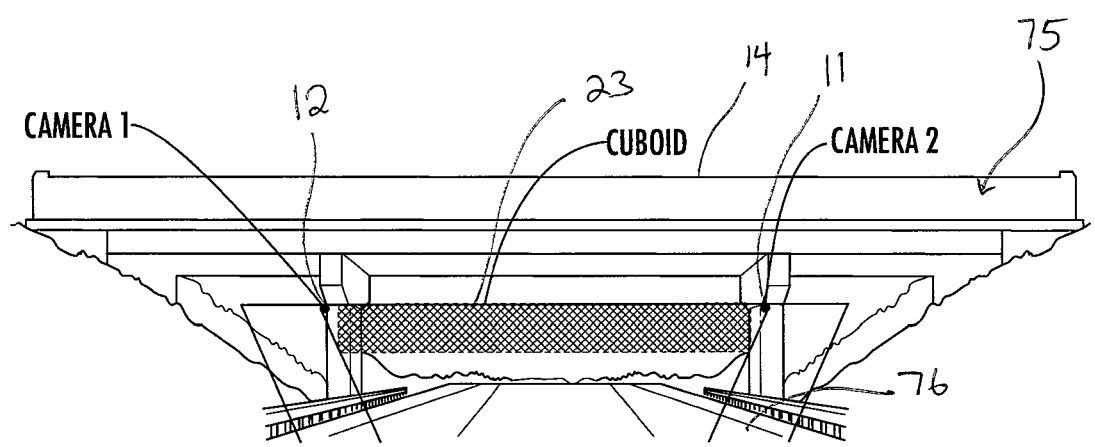

Referring next to FIG. 11, a highway overpass 75 is shown. The two cameras 11 and 12 of the system 100 are mounted in an opposed fashion on piers on either side of the roadway 76 under the overpass 75. The cuboid 23 is defined between the cameras 11 and 12 and extends between the upper limit of the deck 14 of the overpass 75 and the floor of the roadway 76. In this way, any falling object from the deck 14 must necessarily pass through the cuboid 23. This arrangement is similar to that of the vessel 13, and one having ordinary skill in the art will readily appreciate such, with the overpass 75 having a vertical plane extending vertically downward from its outer edge, similarly to the exterior 16 of the vessel 13. The cameras 11 and 12 and the cuboid 23 are arranged to capture and image off the side of the overpass 75 to detect a fall from its deck 14.

Figure 12:
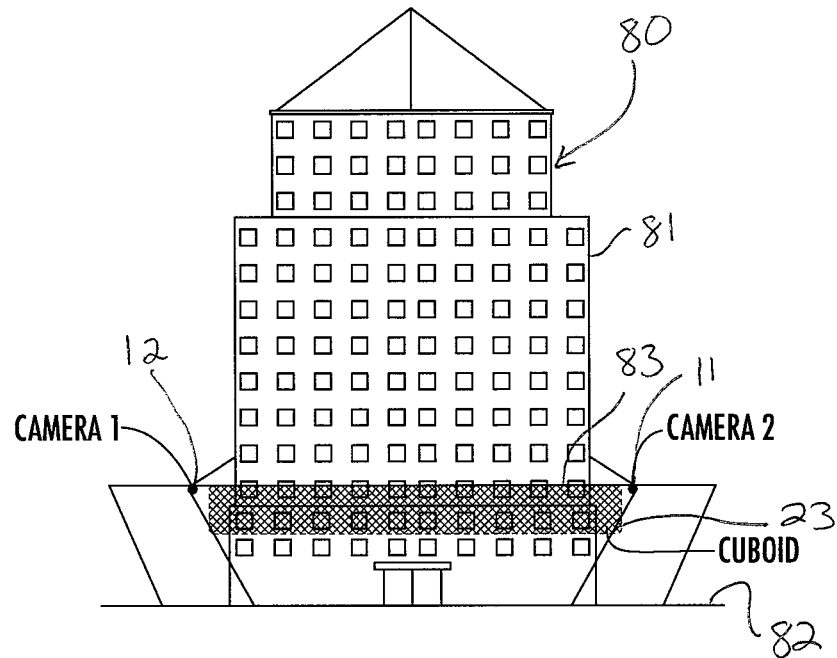

Referring next to FIG. 12, a building 80 is shown. The two cameras 11 and 12 of the system 100 are mounted in an opposed fashion just outside the edges 81 of the building 80. In some embodiments, the cameras 11 and 12 may be mounted on booms extending from the edges 81, or in other embodiments, the cameras 11 and 12 may be mounted on poles extending upward from the ground 82. The cuboid 23 is defined between the cameras 11 and 12 and extends vertically downward from the upper limit of the third story 83 to just above the floor of the first story. In this way, all falls from above the third story 83 will necessarily pass through the cuboid 23. This arrangement is also similar to that of the vessel 13, and one having ordinary skill in the art will readily appreciate such, with the building 80 edge 81 being a vertical similar to the exterior 16 of the vessel 13. The cameras 11 and 12 and the cuboid 23 are arranged to capture and image outside of the building 80 so as to detect a fall from above the third story 83.

In each of the three exemplary embodiments of FIGS. 10-12, the system 100 operates identically as it does for the vessel 13. Briefly as a review, and without describing all of the elements of the system 100, objects falling from above the cuboid 23 pass through the cuboid 23, and the cameras 11 and 12 record those falls. The recordings from each of the cameras 11 and 12 are processed to determine characteristics such as height of the object, width of the object, range of the object from the recording camera, velocity of the object, acceleration of the object, trajectory and trajectory segment of the object, and position of the object. These characteristics are then compared for each of the cameras, and if conforming comparisons are made, an event such as a fall is identified. Information about the fall is recorded and transmitted with an alarm.

Figure 13:
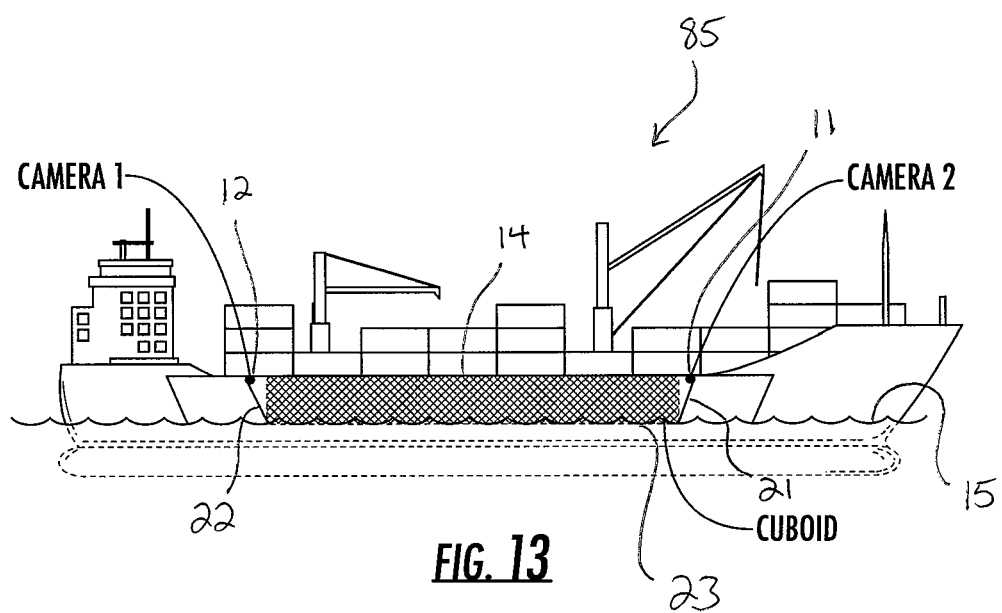

Turning now to FIG. 13, a cargo or container ship 85 is shown. Container ships are particularly vulnerable to onboarding or over-boarding assaults. Pirates, especially those around the Horn of Africa, target such ships because they generally carry valuable cargo but are staffed by small, lightly-armed crews. Over-boarding involves pirates pulling a small boat up alongside the container ship 85, fixing a ladder or rope to the ship 85, and climbing up from the waterline to the deck of the ship 85. The system 100 is useful for detecting such over-boarding movement. Indeed, the system 100 is just as useful for monitoring upward movements along a structure as it is for downward movements such as falls. In FIG. 13, the cameras 11 and 12 are mounted in a similar fashion as they are in FIG. 1 on the vessel 13. Indeed, there are no differences in the arrangement of the elements of the system 10 on the container ship 85 from their arrangement on the vessel 13. The cameras 11 and 12 are oriented in an opposing fashion, each with their own view volumes 21 and 22 forming the cuboid 23 between the upper limit of the lowest deck 14 and the floor of the waterline 15. Moreover, the same system 100, and the same operational steps described above with respect to the system 100, are used to monitor and identify an event. However, because the objects are climbing up the side of the container ship 85 rather than falling therefrom, they are not subject to determinable acceleration and velocity calculations, and so predictions about the origin of the movement (analogous to the deck from which a fall originated) cannot be made. Nevertheless, because the system 100 exploits the two opposed cameras 11 and 12 and comparisons of recorded and processed images made by those two cameras, an object moving through the cuboid 23 can nevertheless be tracked and identified using the system 100.

A preferred embodiment is fully and clearly described above so as to enable one having skill in the art to understand, make, and use the same. Those skilled in the art will recognize that modifications may be made to the described embodiment without departing from the spirit of the invention. To the extent that such modifications do not depart from the spirit of the invention, they are intended to be included within the scope thereof.

The invention claimed is:

1. A method of detecting a movement event along a structure above a floor, the method comprising the steps of:
    providing opposing first and second imaging devices, each having an angular field of view, wherein the angular fields of view of each of the first and second imaging devices overlap to establish a detection cuboid, the detection cuboid having:
        a ceiling extending along a horizontal upper boundary common to the angular fields of view of the first and second imaging devices;
        a horizontal base, wherein the horizontal upper boundary and the horizontal base are both parallel to the floor; and
        an inner boundary extending along a vertical plane which is registered with an outer edge of the structure;
    contemporaneously recording first and second video streams, respectively, of the detection cuboid while the object is actively moving through the detection cuboid established by the overlap of the first and second imaging devices;
    monitoring, in the detection cuboid established by the overlap of the first and second imaging devices, an object in both the first and second video streams while the object is actively moving in the detection cuboid;
    determining first and second characteristics of the object from the first and second video streams, respectively;
    comparing the first and second characteristics and identifying a movement event in response to a conforming comparison;
    determining a first range of the object from the first imaging device and a second range of the object from the second imaging device; and
    determining a real-word location of the object from the first range, the second range, the angular fields of view of the first and second imaging devices, a real-world position of the structure, and a dimension of the object.

2. The method of claim 1, wherein the step of comparing includes comparing the first characteristic from the first video stream to the second characteristic from the second video stream.

3. The method of claim 1, wherein the step of comparing includes comparing the first and second characteristics from the first and second video streams with an expected characteristic.

4. The method of claim 1, wherein the first and second characteristics include at least one of a height of the object, a width of the object, the first range of the object from the first imaging device, the second range of the object from the second imaging device, a velocity of the object, an acceleration of the object, a trajectory of the object, a segment of the trajectory of the object, and a position of the object.

5. The method of claim 1, wherein the first imaging device has a first view volume and the second imaging device has a second view volume which overlaps the first view volume to define the detection cuboid.

6. The method of claim 5, wherein the detection cuboid is limited vertically to extending between the floor and a lowest height along the structure above the floor.

7. The method of claim 1, wherein the first and second imaging devices are thermal cameras.

8. The method of claim 1, wherein the first and second imaging devices have larger angular fields of view in a vertical direction than in a horizontal direction.

9. The method of claim 1, wherein the first and second imaging devices are oriented so that the first and second view volumes extend across an exterior of the structure.

10. The method of claim 1, further comprising the step of transmitting an alarm, the alarm including portions of the first and second video streams including the movement event, a time of the movement event, and a location of the movement event.

11. A method of detecting movement along a structure above a horizontal floor, the structure having an exterior with an outer edge, the method comprising the steps of:
    providing opposing first and second imaging devices, each having an angular field of view, and each contemporaneously recording first and second video streams, respectively, wherein the first imaging device has a first view volume, and the second imaging device has a second view volume which overlaps the first view volume to define a detection cuboid;
    wherein the detection cuboid has an inner boundary which extends along a vertical plane which is registered with the outer edge of the structure, and the detection cuboid also extends between a ceiling, which is along a horizontal upper boundary common to the angular fields of view of the first and second imaging devices, and a base which is defined by the floor, wherein said horizontal upper boundary is parallel to the floor;
    monitoring, in the detection cuboid established by the overlap of the first and second imaging devices, and in both the first and second video streams simultaneously, an object actively moving along the structure and in the detection cuboid;
    processing the first and second video streams;
    identifying a man overboard event in response to an object in the detection cuboid having determined characteristics which conform to expected characteristics;
    determining a first range of the object from the first imaging device and a second range of the object from the second imaging device; and determining a real-world location of the object from the first range, the second range, the angular fields of view of the first and second imaging devices, a real-world position of the structure, and a dimension of the object.

12. The method of claim 11, wherein the determined characteristics include at least one of a height of the object, a width of the object, the first range of the object from the first imaging device, the second range of the object from the second imaging device, a velocity of the object, an acceleration of the object, a trajectory of the object, a segment of the trajectory of the object, and a position of the object.

13. The method of claim 11, wherein the first and second imaging devices have larger angular fields of view in a vertical direction than in a horizontal direction.

14. The method of claim 11, wherein the detection cuboid is bound between the floor and a lowest height along the structure above the floor.

15. The method of claim 11, wherein the first and second imaging devices are oriented so that the first and second view volumes extend across the exterior of the structure.

16. A system of detecting a movement event on a structure above a horizontal floor, the structure having an exterior with an outer edge, the system comprising:
   opposing first and second imaging devices, each having an angular field of view, and each having first and second view volumes and configured to record first and second video streams of the first and second view volumes, respectively;
   a detection cuboid established by an overlap of the first and second view volumes, wherein the detection cuboid has:
      a height bound along a horizontal above the floor, parallel to the floor; and
      an inner boundary which extends along a vertical plane which is registered with the outer edge of the structure; and
   a computer coupled in data communication with the first and second imaging devices, the computer configured to contemporaneously process the first and second video streams and identify a man overboard event in response to an object actively moving along the structure in the detection cuboid and having determined characteristics which conform to expected characteristics;
   wherein the computer is further configured to determine a real-world location of the object, such location determined from a first range of the object from the first imaging device, a second range of the object from the second imaging device, the angular fields of view of the first and second imaging devices, a real-world position of the structure, and a dimension of the object.

17. The system of claim 16, wherein the first and second imaging devices are thermal cameras.

18. The system of claim 16, wherein the first and second imaging devices have larger angular fields of view in a vertical direction than in a horizontal direction.

19. The system of claim 16, wherein the first and second imaging devices are oriented so that the first and second view volumes extend across the exterior of the structure.

20. The system of claim 16, wherein:
   the first and second imaging devices are spaced apart from each other by an inter-camera distance;
   the inter-camera distance is limited by a maximum range of the imaging devices; and
   the maximum range is limited by a pixel-on-target minimum for the object in the detection cuboid.

* * * * *